(12) United States Patent
Liu et al.

(10) Patent No.: US 11,394,066 B2
(45) Date of Patent: Jul. 19, 2022

(54) BATTERY HEATING SYSTEM AND METHOD

(71) Applicant: Contemporary Amperex Technology Co., Limited, Ningde (CN)

(72) Inventors: Yu Liu, Ningde (CN); Qidong Lou, Ningde (CN); Qiandeng Li, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 203 days.

(21) Appl. No.: 16/964,314

(22) PCT Filed: Nov. 29, 2019

(86) PCT No.: PCT/CN2019/122132
§ 371 (c)(1),
(2) Date: Jul. 23, 2020

(87) PCT Pub. No.: WO2020/108635
PCT Pub. Date: Jun. 4, 2020

(65) Prior Publication Data
US 2020/0350649 A1    Nov. 5, 2020

(30) Foreign Application Priority Data

Nov. 30, 2018 (CN) .......................... 201811457403.3

(51) Int. Cl.
*H01M 10/6571* (2014.01)
*H01M 10/615* (2014.01)
*H01M 10/633* (2014.01)

(52) U.S. Cl.
CPC ..... *H01M 10/6571* (2015.04); *H01M 10/615* (2015.04); *H01M 10/633* (2015.04)

(58) Field of Classification Search
CPC ........... H01M 10/6571; H01M 10/633; H01M 10/615
See application file for complete search history.

(56) References Cited

U.S. PATENT DOCUMENTS

| 9,214,706 B2 | 12/2015 | Xu et al. |
| 2014/0099523 A1 | 4/2014 | Feuerstack et al. |
| 2017/0256832 A1 | 9/2017 | Li et al. |

FOREIGN PATENT DOCUMENTS

| CN | 103213508 A | 7/2013 |
| CN | 203056041 A | 7/2013 |

(Continued)

OTHER PUBLICATIONS

The First Official Action and search report dated Jul. 17, 2020 for Chinese application No. 201811457403.3, 12 pages.

(Continued)

*Primary Examiner* — Karie O'Neill Apicella
(74) *Attorney, Agent, or Firm* — Law Offices of Liaoteng Wang (57) ABSTRACT

Battery heating systems and methods are provided in the present disclosure. A battery heating system includes: a temperature sampling module configured to collect a target sampling temperature; a first switch configured to be turned on or off based on a driving signal; a control module configured to determine, based on the target sampling temperature and a correspondence between the target sampling temperature and the driving signal, a duration where the first switch is controlled to be turned on and a duration where the first switch is controlled to be turned off, and generate the driving signal; and a heating module configured to heat the battery module set using an output power of the battery module set when the first switch is turned on, and stop (Continued)

heating the battery module set when the first switch is turned off. As a result, fineness of battery heating can be improved.

8 Claims, 5 Drawing Sheets

(56) References Cited

FOREIGN PATENT DOCUMENTS

| | | |
|---|---|---|
| CN | 104377402 A | 2/2015 |
| CN | 105093099 A | 11/2015 |
| CN | 105190987 A | 12/2015 |
| CN | 105226757 A | 1/2016 |
| CN | 105633506 A | 6/2016 |
| CN | 105789734 A | 7/2016 |
| CN | 107919506 A | 4/2018 |
| CN | 108336453 A | 7/2018 |
| CN | 108390131 A | 8/2018 |
| CN | 108736107 A | 11/2018 |
| CN | 108808173 A | 11/2018 |
| EP | 1333521 A2 | 8/2003 |
| JP | 2015157532 A | 9/2015 |
| WO | 2017179879 A | 10/2017 |

OTHER PUBLICATIONS

PCT International Search Report for PCT/CN2019/122132, dated Mar. 5, 2020, 11 pages.
The Notice of Allowance and search report dated Oct. 20, 2020 for Chinese application No. 201811457403.3, 6 pages.
The extended European search report for EP Application No. 19888514.7, dated Mar. 22, 2021, 5 pages.
The First Office Action for EP Application No. 19888514.7, dated Jun. 29, 2021, 5 pages.

BATTERY HEATING SYSTEM AND METHOD

CROSS-REFERENCE TO RELATED APPLICATION

The present application is a National Stage of International Application No. PCT/CN2019/122132, filed on Nov. 29, 2019, which claims priority to Chinese Patent Application No. 201811457403.3 filed on Nov. 30, 2018, both of which are incorporated herein by reference in its entirety.

TECHNICAL FIELD

The present disclosure relates to the field of batteries, and in particular, to a battery heating system and method.

BACKGROUND

With development of new energy, the new energy is employed as power in more and more fields. For example, batteries may be used as power. Safety of batteries has attracted widespread attention from consumers and businesses.

Since an internal resistance of a battery will increase sharply as the temperature decreases, a capacity of the battery will decrease rapidly as the temperature decreases. When an environment temperature of the battery decreases, an output power of the battery also decreases. In order to ensure the performance of the output power of the battery, the battery needs to be heated according to the temperature of the battery collected in real time, for example, when the battery is used as the power of a new energy vehicle, especially during driving in a low-temperature environment.

SUMMARY

Embodiments of the present disclosure provide a battery heating system and method, which may improve fineness of battery heating.

In one aspect, an embodiment of the present disclosure provides a battery heating system, including: a temperature sampling module configured to collect a target sampling temperature, wherein the target sampling temperature includes a real-time temperature of a battery module set or a real-time temperature of an external environment of a battery pack to which the battery module set belongs, the battery module set includes N battery modules, and N is a positive integer; a first switch configured to be turned on or off based on a driving signal; a control module configured to determine, based on the target sampling temperature and a correspondence between the target sampling temperature and the driving signal, a duration where the first switch is controlled to be turned on and a duration where the first switch is controlled to be turned off; and generate, based on the duration where the first switch is controlled to be turned on and the duration where the first switch is controlled to be turned off, the driving signal, wherein the correspondence between the target sampling temperature and the driving signal includes a correspondence between the target sampling temperature and the duration where the first switch is controlled to be turned on and a correspondence between the target sampling temperature and the duration where the first switch is controlled to be turned off; and a heating module, wherein one terminal of the heating module is connected to one terminal of the battery module set via the first switch, and another terminal of the heating module is connected to another terminal of the battery module set, and wherein the heating module is configured to heat the battery module set using an output power of the battery module set when the first switch is turned on, and stop heating the battery module set when the first switch is turned off.

In another aspect, an embodiment of the present disclosure provides a battery heating method, including: collecting, by the temperature sampling module, the target sampling temperature; determining, by the control module based on the target sampling temperature and the correspondence between the target sampling temperature and the driving signal, the duration where the first switch is controlled to be turned on and the duration where the first switch is controlled to be turned off; generating and outputting, by the control module based on the duration where the first switch is controlled to be turned on and the duration where the first switch is controlled to be turned off, the driving signal; receiving, by the first switch, the driving signal so as to be turned on or off based on the driving signal; heating, by the heating module, the battery module set using the output power of the battery module set when the first switch is turned on; and stopping, by the heating module, heating of the battery module set when the first switch is turned off.

According to the battery heating system and method in the embodiments of the present disclosure, the first switch may be turned on or off based on the driving signal. When the first switch is turned on, the heating module may heat the battery module set; and when the first switch is turned off, the heating module may stop heating the battery module set. The driving signal is determined based on the duration where the first switch is controlled to be turned on and the duration where the first switch is controlled to be turned off, and there are correspondences between the duration where the first switch is controlled to be turned on and the target sampling temperature, and between the duration where the first switch is controlled to be turned off and the target sampling temperature. Therefore, based on the target sampling temperature collected in real time, the control module may control the duration where the first switch is controlled to be turned on and the duration where the first switch is controlled to be turned off, and then control a heating period and a stop heating period of the battery module set by the heating module. As a result, heating of the battery is refined, and thus the fineness in heating the battery is improved.

BRIEF DESCRIPTION OF THE DRAWINGS

In order to more clearly illustrate technical solutions of the embodiments of the present disclosure, drawings used in the embodiments of the present disclosure will be briefly described below. For those skilled in the art, other drawings may be obtained from these figures without any creative work.

DETAILED DESCRIPTION

Features and exemplary embodiments in various aspects of the present disclosure will be described in detail. The present disclosure will be further described in detail below with reference to the accompanying drawings and embodiments, to make the purposes, the technical solutions, and the advantages clearer. It is understood that the specific embodiments described herein are only to be construed as illustrative and not limiting. The present disclosure may be practiced without some of the details of these specific details, as would be understood by the skilled in the art. The following description of the embodiments is merely intended to provide a better understanding of the disclosure by illustration of examples of the present disclosure.

It should be noted that, in this context, relationship terms such as first and second are used merely to distinguish one entity or operation from another entity or operation, and do not necessarily require or imply that there is any such an actual relationship or order between such entities or operations. Furthermore, the term "comprise" or "include" or any other variations thereof is intended to encompass a non-exclusive inclusion, such that a process, method, article, or device that comprises a plurality of elements includes not only those elements but also other elements that are not listed exactly, or elements that are inherent to such a process, method, article, or device. An element that is defined by the phrase "comprising", without limiting the disclosure, does not exclude the presence of additional elements in the process, method, article, or device.

A battery pack may include multiple battery modules connected in series, in parallel, or both. The multiple battery modules within the battery pack may be referred to as a battery module set, and each battery module may include multiple battery cells.

The embodiments of the present disclosure provide battery heating systems and methods, which may be applied to a scenario of driving at a low temperature. In a battery heating system, a heating module may heat a battery module set using an output power of the battery module set. In the embodiments of the present disclosure, a first switch is provided between the heating module and the battery module set, and a control module is used to control an on-duration and an off-duration of the first switch. When the first switch is controlled by the control module to be on, the heating module heats the battery module set; and when the first switch is controlled by the control module to be off, the heating module stops heating the battery module set.

The control module may control the on-duration of the first switch and the off-duration of the first switch based on a real-time temperature of the battery module set or a real-time temperature of an external environment of a battery pack to which the battery module set belongs. In the embodiments of the present disclosure, the on-duration of the first switch and the off-duration of the first switch may be controlled based on the temperature of the battery module set or the temperature of the external environment of the battery pack to which the battery module set belongs, so as to realize dynamic control of the heating module. Therefore, the fineness of battery heating can be improved.

Figure 1:
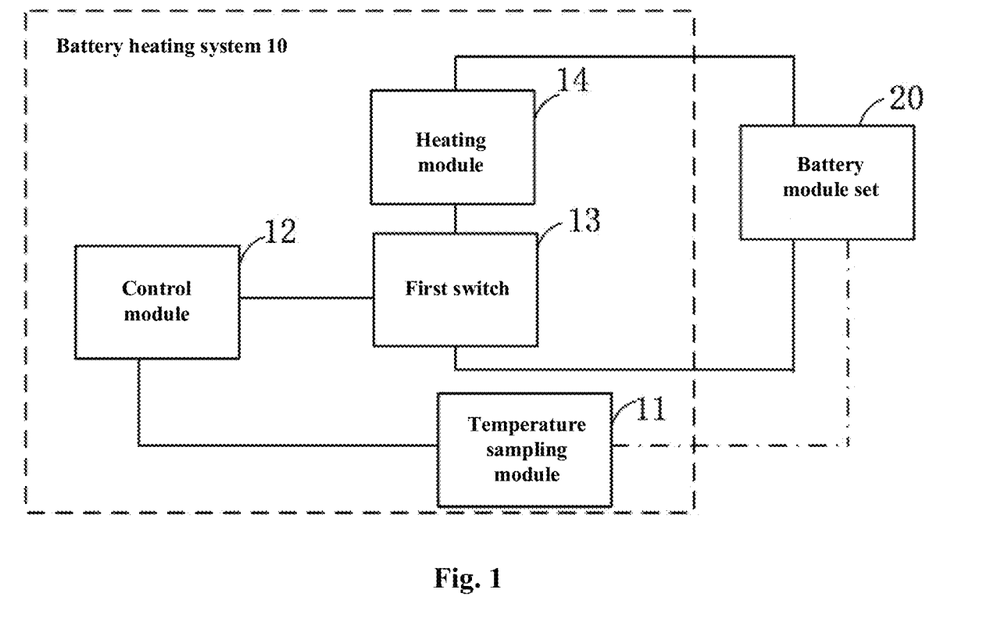
FIG. 1 is a schematic structural diagram of a battery heating system according to an embodiment of the present disclosure.

FIG. 1 is a schematic structural diagram of a battery heating system according to an embodiment of the present disclosure.

As shown in FIG. 1, the battery heating system 10 may include a temperature sampling module 11, a control module 12, a first switch 13, and a heating module 14.

The temperature sampling module 11 may be configured to collect a target sampling temperature. The target sampling temperature may include: a real-time temperature of a battery module in a battery module set 20, an average real-time temperature of multiple battery modules in the battery module set 20, an internal temperature of a battery pack to which the battery module set 20 belongs, a temperature of a shell of the battery pack to which the battery module set 20 belongs, or a real-time temperature of an external environment of the battery pack to which the battery module set 20 belongs. The battery module set 20 may include N battery modules, where N is a positive integer.

In some embodiments of the present disclosure, when the real-time temperature of the battery module set 20 is required to be collected as the target sampling temperature, the dot-dash line in FIG. 1 indicates that the temperature sampling module 11 may collect the target sampling temperature from the battery module set 20. Specifically, a temperature sampling unit may be provided for each of the N battery modules included in the battery module set 20. Specifically, each temperature sampling unit may collect the real-time temperature of each battery cell included in the corresponding battery module.

Exemplarily, if a battery module includes i battery cells, the temperature sampling unit corresponding to the battery module may collect a total of i pieces of real-time temperature data, T1, T2, . . . , Ti. In this example, one of the collected i pieces of real-time temperature data with minimum value may be used as the real-time temperature of the battery module, where i is a positive integer.

Accordingly, in this example, a minimum real-time temperature value may be selected from the real-time temperatures of the N battery modules as the real-time temperature of the battery module set 20.

In some embodiments of the present disclosure, when the real-time temperature of the external environment of the battery pack to which the battery module set 20 belongs is required to be collected as the target sampling temperature, in one case, the temperature sampling module 11 may be disposed at the outside of the body of the battery pack. In another case, the battery pack may be installed in a new energy vehicle, and the temperature sampling module 11 may be disposed on a vehicle chassis of the new energy vehicle.

In some embodiments of the present disclosure, the temperature sampling module 11 and the control module 12 may be connected via a first communication line. The control module 12 may send a control instruction to the temperature sampling module 11 via the first communication line for controlling the temperature sampling module 11 to collect the target sampling temperature. The temperature sampling module 11 may collect the target sampling temperature in response to the control instruction, and return the collected target sampling temperature to the control module 12 via the first communication line.

In some embodiments, a specific implementation of the first communication line may be a daisy-chain communication structure.

It should be noted that the control module 12 and the temperature sampling module 11 may also be connected by means of wireless communication.

In some embodiments, when the temperature sampling module 11 includes multiple temperature sampling units, adjacent temperature sampling units may be connected through a second communication line. The real-time temperatures of the multiple battery modules collected by the multiple temperature sampling units may be transmitted and gathered through the second communication line. The gathered real-time temperatures of the multiple battery modules may be converted by an isolation conversion unit into a data stream in conformity with a protocol of the first communication line, so as to return to the control module 12.

In an embodiment, a specific implementation of the second communication line may be a daisy-chain communication structure.

The control module 12 may be configured to: determine, based on the target sampling temperature and a correspondence between the target sampling temperature and a driving signal, a duration where the first switch 13 is controlled to be turned on and a duration where the first switch 13 is controlled to be turned off; and generate, based on the duration where the first switch 13 is controlled to be turned on and the duration where the first switch 13 is controlled to be turned off, the driving signal.

The correspondence between the target sampling temperature and the driving signal may include a correspondence between the target sampling temperature and the duration where the first switch 13 is controlled to be turned on and a correspondence between the target sampling temperature and the duration where the first switch 13 is controlled to be turned off.

In some embodiments of the present disclosure, the control module 12 may be configured to: determine whether the target sampling temperature is lower than a preset initial heating temperature threshold; when the target sampling temperature is lower than the preset initial heating temperature threshold, determine, based on the target sampling temperature and the correspondence between the target sampling temperature and the driving signal, the duration where the first switch 13 is controlled to be turned on and the duration where the first switch 13 is controlled to be turned off; and generate the driving signal based on the duration where the first switch 13 is controlled to be turned on and the duration where the first switch 13 is controlled to be turned off.

In some embodiments of the present disclosure, the driving signal may include two different driving sub-signals: a first driving sub-signal and a second driving sub-signal. The first driving sub-signal may be used to control the first switch 13 to be turned on, and the second driving sub-signal may be used to control the first switch 13 to be turned off.

In some embodiments of the present disclosure, during operation of a vehicle, in order to ensure that the target sampling temperature is always maintained at a battery target operating temperature, when the target sampling temperature is not smaller than a first temperature threshold and not greater than the battery target operating temperature: the greater a difference between the target sampling temperature and the battery target operating temperature, the longer the duration where the first switch 13 is controlled to be turned on is and the shorter the duration where the first switch 13 is controlled to be turned off is; and the smaller the difference between the target sampling temperature and the battery target operating temperature, the shorter the duration where the first switch 13 is controlled to be turned on is and the longer the duration where the first switch 13 is controlled to be turned off is.

It should be noted that, when the target sampling temperature is smaller than the first temperature threshold, the duration where the first switch 13 is controlled to be turned off is 0 second, that is, the first switch 13 is continuously turned on; and when the target sampling temperature reaches the battery target operating temperature, the duration where the first switch 13 is controlled to be turned on is 0 second, that is, the first switch 13 is continuously turned off.

It should also be noted that, as the battery module set 20 itself has a thermal effect, when the target sampling temperature reaches a second temperature threshold, the battery module set 20 may rely on its own thermal effect to keep the target sampling temperature at the battery target operating temperature, and the duration where the first switch 13 is controlled to be turned on may be set to be 0 second. The second temperature threshold may be smaller than the battery target operating temperature, and the second temperature threshold may be greater than the first temperature threshold.

In some embodiments, the battery target operating temperature may indicate a temperature at which the battery modules set is expected to operate. When the target sampling temperature reaches the battery target operating temperature, it may be indicated that the battery module set is operating at the expected temperature.

In some embodiments of the present disclosure, the correspondence between the target sampling temperature and the driving signal may include: a correspondence between the target sampling temperature and a ratio of the duration where the first switch 13 is controlled to be turned on to the duration where the first switch 13 is controlled to be turned off.

In some embodiments, the driving signal is represented by a pulse signal with a cycle of T.

It should be noted that when the driving signal is a pulse signal, the correspondence between the target sampling temperature and the driving signal may include: a correspondence between the target sampling temperature and the duration where the first switch 13 is controlled to be turned on of each cycle, and a correspondence between the target sampling temperature and the duration where the first switch 13 is controlled to be turned off of each cycle.

In an embodiment, the first driving sub-signal may be at a high level, and the second driving sub-signal may be at a low level.

Accordingly, the correspondence between the target sampling temperature and the driving signal may be expressed as a relationship between the target sampling temperature and a duty ratio of the driving signal. The duty ratio of the driving signal may indicate a ratio of the duration where the first switch 13 is controlled to be turned on of a cycle to the total duration of the cycle.

Figure 2:
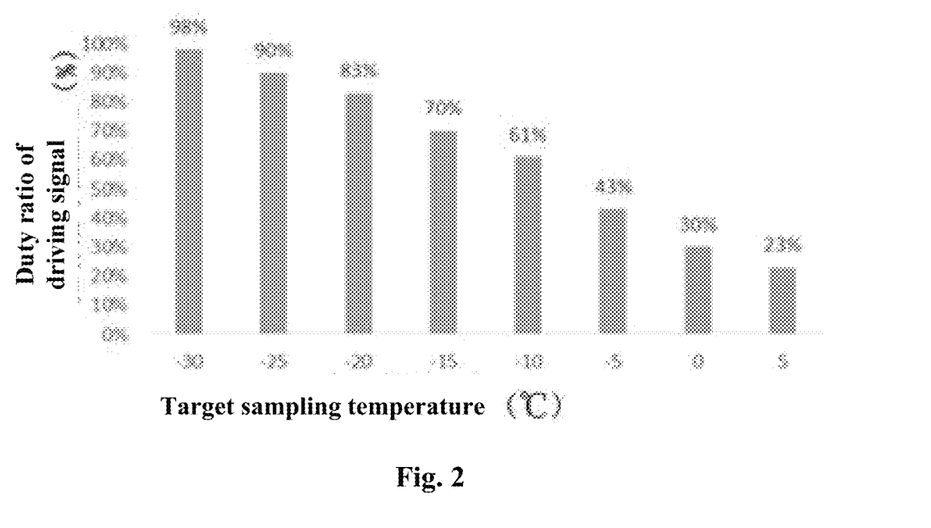
FIG. 2 is a schematic diagram of a partial correspondence between a target sampling temperature and a duty ratio of a driving signal according to an example of an embodiment of the present disclosure.

As an example, FIG. 2 is a schematic diagram of a partial correspondence between a target sampling temperature and a duty ratio of a driving signal according to an example of an embodiment of the present disclosure.

As shown in FIG. 2, if the battery target operating temperature is 20° C., the target sampling temperature is the real-time temperature of the external environment of the battery pack to which the battery module set 20 belongs. When the target sampling temperature is −30° C., the corresponding duty ratio of the driving signal is 98%. When the target sampling temperature is −25° C., the corresponding duty ratio of the driving signal is 90%. When the target sampling temperature is −20° C., the corresponding duty ratio of the driving signal is 83%. When the target sampling temperature is −15° C., the corresponding duty ratio of the driving signal is 70%. When the target sampling temperature is −10° C., the corresponding duty ratio of the driving signal is 61%. When the target sampling temperature is −5° C., the corresponding duty ratio of the driving signal is 43%. When the target sampling temperature is 0° C., the corresponding duty ratio of the driving signal is 30%. When the target sampling temperature is 5° C., the corresponding duty ratio of the driving signal is 23%.

It should be noted that, in this example, the first temperature threshold is smaller than −30° C., that is, when the target sampling temperature does not exceed the first temperature threshold, the duty ratio of the driving signal is 100%. In this example, when the target sampling temperature is greater than 5° C., the battery module may rely on its own thermal effect to keep the target sampling temperature at 20° C., that is, the second temperature threshold is equal to 5° C.

It should also be noted that for different situations such as different battery module sets 20 and different battery target operating temperatures, the correspondence between the target sampling temperature and the driving signal is different. Therefore, the correspondence between the target sampling temperature and the driving signal often requires a vehicle calibration.

In some embodiments of the present disclosure, when the driving signal is a pulse signal, the control module 12 may be configured to determine a difference between the target sampling temperature and the battery target operating temperature as an actual temperature deviation.

The duration where the first switch 13 is controlled to be turned on and the duration where the first switch 13 is controlled to be turned off may be determined based on the actual temperature deviation and a proportion-integral-derivative (proportion-integral-derivative, PID) algorithm.

In some embodiments of the present disclosure, the control module 12 may be implemented as a controller and a driving unit.

The controller may be configured to send a driving instruction for controlling the driving unit to generate the driving signal, and send various instructions to other functional modules of the battery heating system.

The driving unit may be configured to receive the driving instruction sent by the controller of the control module 12 for controlling the driving unit to generate the driving signal, and generate, in response to the driving instruction, the driving signal capable of driving the first switch 13 to be turned on or off.

It should be noted that an isolation unit may be provided between the driving unit and the controller of the control module 12 to electrically isolate communication therebetween.

The first switch 13 may be configured to be turned on or off based on the driving signal.

In some embodiments of the present disclosure, the first switch 13 may be a switch that can be turned on or off under the control of the control module 12.

In some embodiments, the first switch 13 may include a relay, a metal oxide semiconductor (metal oxide semiconductor, MOS) field-effect transistor, or other switches.

In some optional embodiments, in order to achieve fast and accurate control of the heating module 14 through fast switching of the first switch 13, the first switch 13 may include a MOS field-effect transistor.

It should be noted that when the heating module 14 is controlled by the relay, mechanical properties of the relay may not allow quick switching, and it is required to dispose a corresponding control circuit for the relay. Therefore, compared with the relay, in this embodiment, the control module 12 may control the heating module 14 by controlling the MOS field-effect transistor. As a result, fast and accurate control of the heating module 14 can be realized, while the entire battery heating system is relatively simple and energy consumption of the entire battery heating system is reduced.

In some embodiments of the present disclosure, the first switch 13 is preferably a switch with over-temperature protection. Exemplarily, the first switch 13 may be a MOS field-effect transistor with over-temperature protection.

In some embodiments, if the first switch 13 is a MOS field-effect transistor with over-temperature protection, the battery heating system may further include a signal feedback check module.

Specifically, the driving signal of the first switch 13 may be returned to the control module 12 as a feedback signal, the driving signal generated by the control module 12 may be used as a reference driving signal, and it may be determined whether the feedback signal is the same as the reference driving signal. If they are the same, it may be determined that the feedback signal is a normal feedback signal, and the first switch 13 is normal. If the feedback signal does not completely track the reference driving signal, it is considered that there is an over-temperature fault at the first switch 13.

Figure 3:
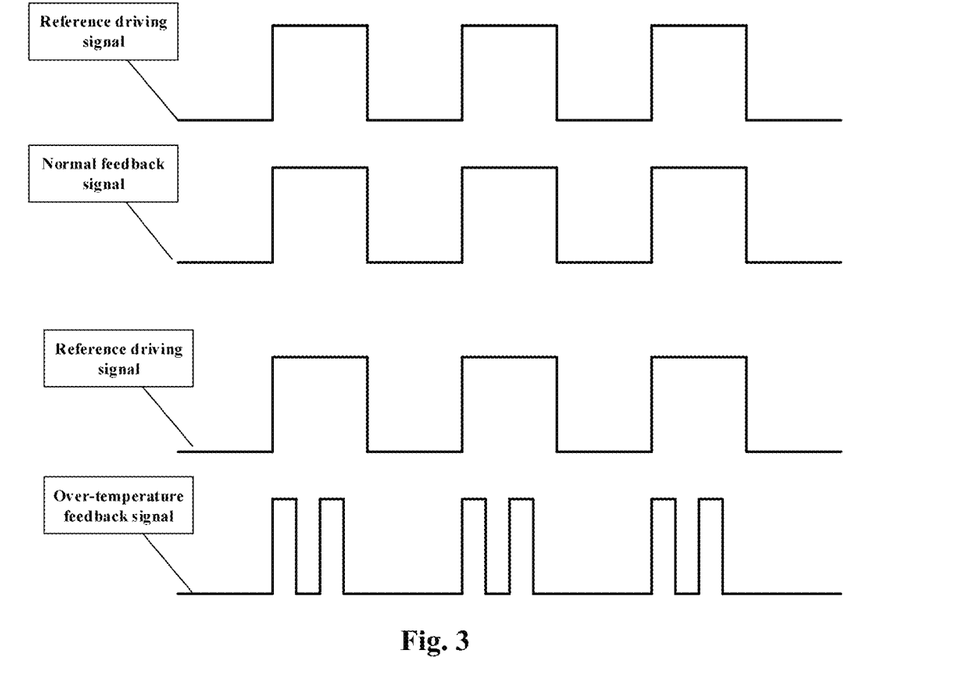
FIG. 3 is a schematic diagram of a reference driving signal and a feedback signal according to an example of an embodiment of the present disclosure.

As an example, FIG. 3 is a schematic diagram of a reference driving signal and a feedback signal according to an example of an embodiment of the present disclosure.

As shown in FIG. 3, in a case where the reference driving signal is a pulse signal, if the duty ratio of the feedback signal is the same as that of the reference driving signal, the feedback signal is determined to be a normal feedback signal; and if compared to the reference driving signal, the feedback signal is frequently pulled to a low level when the reference driving signal is at a high level, the feedback signal is determined to be an over-temperature feedback signal.

In some embodiments, in order to protect the first switch 13 from over-temperature, when the feedback signal is an over-temperature feedback signal, the first switch 13 may achieve a short-ground characteristic of the input impedance. Specifically, when the short-ground characteristic of the input impedance of the first switch 13 is activated, a short circuit is formed between the gate and the drain of the first switch 13, the voltage of the gate is smaller than a threshold voltage, and the first switch 13 is turned off.

One terminal of the heating module 14 may be connected to one terminal of the battery module set 20 through the first switch 13, and another terminal of the heating module 14 may be connected to another terminal of the battery module set 20. When the first switch 13 is turned on, the heating module 14 may heat the battery module set 20 using the output power of the battery module set 20. When the first switch 13 is turned off, the heating module 14 may stop heating the battery module set 20.

According to the battery heating system 10 in the embodiments of the present disclosure, the first switch 13 may be turned on or off based on the driving signal. When the first switch 13 is turned on, the heating module 14 may heat the battery module set 20. When the first switch 13 is turned off, the heating module 14 may stop heating the battery module set 20. The driving signal is determined based on the duration where the first switch is controlled to be turned on and the duration where the first switch is controlled to be turned off, and there are correspondences between the duration where the first switch is controlled to be turned on and the target sampling temperature and between the duration where the first switch is controlled to be turned off and the target sampling temperature. Therefore, based on the target sampling temperature collected in real time, the control module 12 may control the duration where the first switch 13 is controlled to be turned on and the duration where the first switch 13 is controlled to be turned off, and then control the heating period and the stop heating period of the battery module set 20 by the heating module 14. As a result, the fineness in heating the battery is improved.

In some embodiments of the present disclosure, in order to improve the uniformity of heating and the heating performance of the heating module 14, the heating module 14 may include N heaters connected in series. The N heaters included in the heating module 14 may be in one-to-one correspondence with the N battery modules included in the battery module set 20.

For example, if the battery module set 20 includes N battery modules connected in series, N heaters connected in series may be provided on one side of the battery module set 20, and each heater heats the corresponding battery module. Preferably, in order to further improve the uniformity of heating and the heating performance of the heating module 14, distances between pairs of the heaters and corresponding battery modules are the same.

It should be noted that, in order to further improve the uniformity of heating and the heating performance of the heating module 14, each heater may include multiple heating units. Specifically, each heater may include m heating units, and the m heating units may be evenly distributed around each battery module set 20, where m is a positive integer. For example, if each heater includes two heating units, N heating units may be disposed on one side of the battery module set 20 in one-to-one correspondence with the N battery modules included in the battery module set 20. The remaining N heating units may be disposed on the other side of the battery module set 20 in one-to-one correspondence with the N battery modules included in the battery module set 20.

In some embodiments of the present disclosure, for heating safety of the battery heating system 10, the battery heating system 10 may further include a second switch.

The second switch may be disposed between the another terminal of the heating module 14 and the another terminal of the battery module set 20.

In some embodiments, when the battery heating system 10 includes the first switch 13 and the second switch, the control module 12 may indirectly control the heating module 14 to heat the battery module set 20 or stop heating the battery module set 20 by controlling the first switch 13 and the second switch to be turned on at the same time or turned off at the same time.

In a scenario where the heating module 14 is required to be controlled to stop heating the battery module set 20, the first switch 13 and the second switch may be set in such a way that when one of the first switch 13 and the second switch fails to be off due to a failure such as adhesion, the heating of the battery module set 20 by the heating module 14 can be stopped timely by controlling another one of the first switch 13 and the second switch fails to be off.

In some optional embodiments, characteristics of the second switch are the same as those of the first switch 13 in the foregoing embodiments, and details are not described herein again.

It should be noted that the second switch may be a relay, a MOS field-effect transistor, or other switch capable of being turned on or off under the control of the control module 12.

In some embodiments of the present disclosure, in order to achieve fast and accurate control of the heating module 14, at least one of the first switch 13 and the second switch may be a MOS field-effect transistor.

For example, the first switch 13 is a MOS field-effect transistor, the second switch is a relay. When the battery module set 20 needs to be heated by the battery heating system 10, the second switch may be controlled to be always in an off state, and the driving signal may be output to the first switch 13.

In some embodiments of the present disclosure, in addition to the first switch 13 and the second switch in the above embodiments, the battery heating system 10 may further include a voltage sampling module.

The voltage sampling module may be respectively connected to both terminals of the heating module 14. The voltage sampling module may be configured to collect first collected voltage data at the one terminal of the heating module 14 and second collected voltage data at the another terminal of the heating module 14 respectively. The one terminal of the heating module 14 may be connected to a negative electrode of the battery module set 20 through the first switch 13, and the another terminal of the heating module 14 may be connected to a positive electrode of the battery module set 20 through the second switch.

The control module 12 may be configured to: determine whether the battery heating system 10 is operating normally based on the first collected voltage data, the second collected voltage data and a preset normal operation judgment condition; and determine that the battery heating system 10 is operating normally if both the first collected voltage data and the second collected voltage data satisfy the normal operation judgment condition.

It should be noted that in the embodiments of the present disclosure, the first collected voltage data may indicate a potential difference between a potential at the one terminal of the heating module 14 and a reference potential. The second collected voltage data may indicate a potential difference between a potential at the another terminal of the heating module 14 and the reference potential. The reference potential may be a potential at the negative electrode of the battery module set 20.

In some embodiments, the voltage sampling module may be connected to the control module 12.

Specifically, the control module 12 may be configured to send an operating instruction the voltage sampling module for instructing the voltage sampling module to collect the first collected voltage data and the second collected voltage data. The voltage sampling module may be configured to collect the first collected voltage data and the second collected voltage data in response to the operating instruction, and return the collected first collected voltage data and second collected voltage data to the control module 12.

The connection between the voltage sampling module and the control module 12 may be a wired connection or a wireless connection.

In an embodiment, an isolation unit may be provided between the voltage sampling module and the control module 12.

In some embodiments of the present disclosure, normal operation of the battery heating system 10 may indicate that there is no heating failure of the battery heating system 10.

For example, if the battery heating system 10 includes the first switch 13 and the second switch, the normal operation of the battery heating system 10 may include that the first switch 13 and the second switch can be normally turned on and off according to the driving signal.

In some embodiments of the present disclosure, the normal operation judgment condition may include: before the battery module set 20 is heated by the heating module 14: when both the first switch 13 and the second switch are turned off, both the first collected voltage data and the second collected voltage data are smaller than a preset first calibration value; when the first switch 13 is turned off and the second switch is turned on, both the first collected voltage data and the second collected voltage data are greater than a preset second calibration value; and when both the first switch 13 and the second switch are turned on, the first collected voltage data is smaller than the preset first calibration value and the second collected voltage data is greater than the preset second calibration value.

The first calibration value is a product of a first calibration voltage and a first calibration coefficient. The first calibration voltage is a voltage at a connection of the second switch and the positive electrode of the battery module set 20 when both the first switch 13 and the second switch are turned off and the battery module set 20 outputs a rated voltage.

The second calibration value is a product of a second calibration voltage and a second calibration coefficient. The second calibration voltage is a voltage at a connection of the heating module 14 and the first switch 13 when both the first switch 13 and the second switch are turned on and the battery module set 20 outputs the rated voltage.

It should be noted that, the first calibration voltage in the embodiments of the present disclosure may indicate a potential difference between a potential at a terminal of the second switch connected to the positive electrode of the battery module set 20 and the reference potential. The second calibration voltage may indicate a potential difference between the potential at the one terminal of the heating module 14 and the reference potential.

It should also be noted that, in other embodiments of the present disclosure, the one terminal of the heating module 14 may also be connected to the positive electrode of the battery module set 20, and the another terminal of the heating module 14 is connected to the negative electrode of the battery module set 20.

In an embodiment, the second collected voltage data may be collected at the one terminal of the heating module 14, and the first collected voltage data may be collected at the another terminal of the heating module 14. In this embodiment, the first calibration voltage may indicate a potential difference between the potential at a terminal of the first switch connected to the positive electrode of the battery module set 20 and the reference potential, and the second calibration voltage may indicate a potential difference between the potential at the another terminal of the heating module 14 and the reference potential.

In an embodiment, the control module 12 may generate a driving signal, and use the driving signal to control the first switch 13 to be turned on or off and the second switch to be in the off state, so that the heating module 14 may heat the battery module set 20. Alternatively, in response to the instruction from the control module 12 for starting operation of the battery heating system 10, the first switch 13 may be turned on or off and the second switch may be in the off state according to the driving signal, so that the heating module 14 may heat the battery module set 20.

For example, the first switch 13 is a low-voltage-side switch and the second switch is a high-voltage-side switch; the first collected voltage data is represented as V_P_1, and the second collected voltage data is represented as V_P_2; the first calibration value is represented as Va, the first calibration voltage is represented as $Va_0$, and the first calibration coefficient is represented as $\alpha_a$; and the second calibration value is represented as Vb, the second calibration voltage is represented as $Vb_0$, and the second calibration coefficient is represented as $\alpha_b$.

The normal operation judgment condition may include before the battery module set 20 is heated by the heating module 14: when both the first switch 13 and the second switch are turned off, V_P_1<Va and V_P_2<Va; when the first switch 13 is turned off and the second switch is turned on, V_P_1>Vb, and V_P_2>Vb; and when both the first switch 13 and the second switch are turned on, V_P_1<Va, and V_P_2>Vb.

Va satisfies formula (1):

$$Va = Va_0 \times \alpha_a \quad (1)$$

Vb satisfies formula (2):

$$Vb = Vb_0 \times \alpha_b \quad (2)$$

In some embodiments, as the first calibration voltage may generate voltage fluctuations, the first calibration coefficient may be smaller than 1. For example, the first calibration coefficient may be 90%.

In some embodiments, if the first switch and the battery module set 20 are both grounded, in view of the effect of ground offset, the second calibration coefficient may be greater than 1. For example, the second calibration coefficient may be 150%.

In some other embodiments, the normal operation judgment condition may include before the heating module 14 finishes heating of the battery module set 20: when the first switch 13 is turned off and the second switch is turned on, both the first collected voltage data and the second collected voltage data are greater than the preset second calibration value; and when both the first switch 13 and the second switch are turned off, both the first collected voltage data and the second collected voltage data are smaller than the preset first calibration value.

In an embodiment, the first switch 13 is continuously in the off state after the driving signal ends; or, the first switch 13 and the second switch are continuously in the off state in response to an instruction to stop heating from the control module 12, so that the heating module 14 may finish heating the battery module set 20.

For example, when the first switch 13 is turned off and the second switch is turned on, V_P_1>Vb, and V_P_2>Vb; and when both the first switch 13 and the second switch are turned off, V_P_1<Va, and V_P_2<Va.

In some embodiments of the present disclosure, in order to ensure the communication quality between the control module 12 and the first switch 13, an isolation unit may be provided between the control module 12 and the first switch 13 to electrically isolate the communication between the control module 12 and the first switch 13.

It should be noted that, when other functional modules except the first switch 13 in the battery heating system 10 communicate with the control module 12, isolation unit(s) may be provided between the other functional modules and the control module 12.

Figure 4:
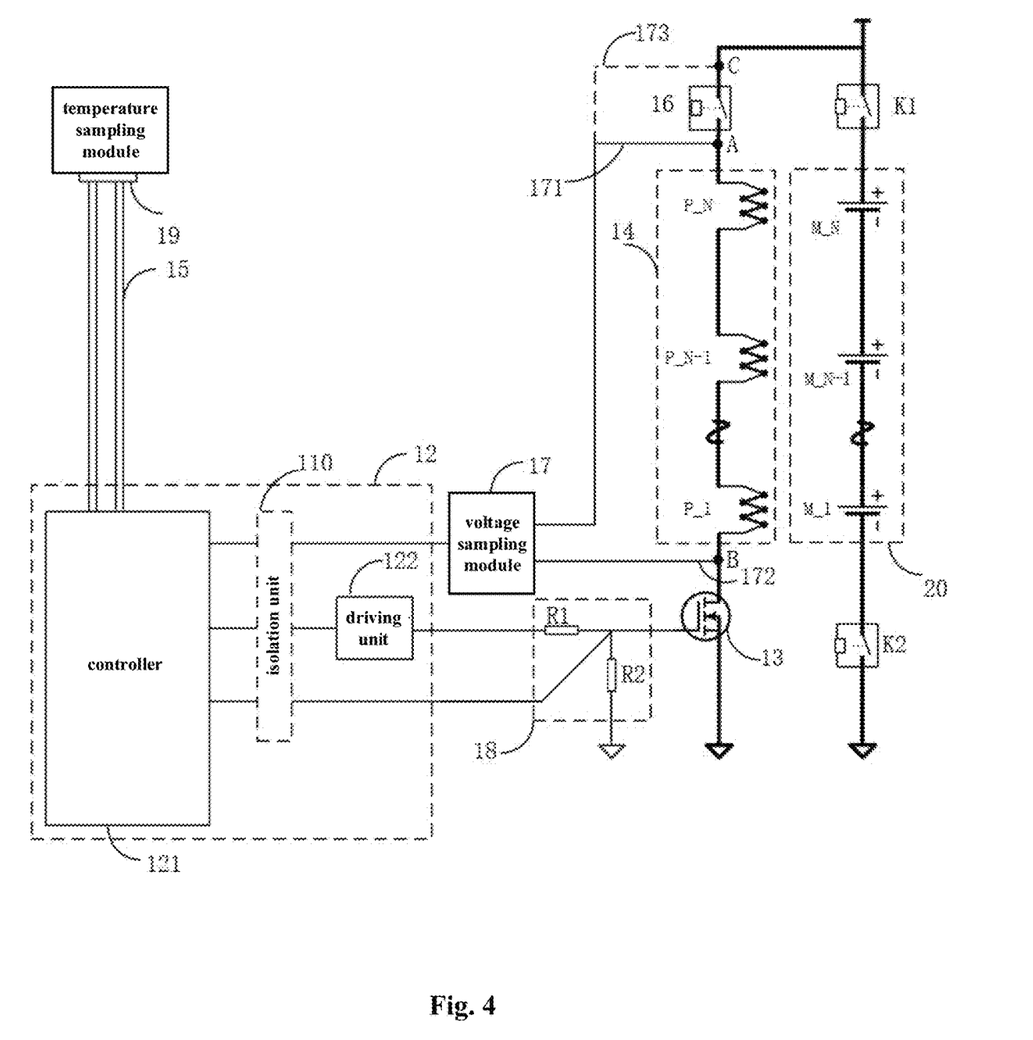
FIG. 4 is a schematic structural diagram of a battery heating circuit according to an embodiment of the present disclosure.

In some embodiments of the present disclosure, when the target sampling temperature is the real-time temperature of the battery module set 20, an implementation of the battery heating system 10 may be a battery heating circuit. FIG. 4 is a schematic structural diagram of a battery heating circuit according to an embodiment of the present disclosure.

As shown in FIG. 4, the battery heating circuit 40 may include: a temperature sampling module 11, a control module 12, a first switch 13, a heating module 14, a first communication line 15, a second switch 16, a voltage sampling module 17, and a signal check-back module 18 and an isolation conversion unit 19.

The battery module set 20 may be consisted of N battery modules connected in series. The N battery modules may be identified as M_1, . . . , M_N-1, M_N, respectively. The end of the battery module set 20 near M_N is the high-voltage end of the battery module set 20, the end of the battery module set 20 near M_1 is the low-voltage end of the battery module set 20, and the low-voltage end of the battery module set 20 is grounded.

After the target sampling temperature is collected by the temperature sampling module 11, the collected target sampling temperature may be converted into a data stream in conformity with a first communication line protocol through the isolation communication unit 19, and then transmitted to the controller 121 through the first communication line 15.

The control module 12 may be respectively connected to the temperature sampling module 11, the voltage sampling module 17, the gate of the first switch 13, the signal check-back module 18, and the second switch 16. The connection between the control module 12 and the second switch module 16 is not shown in FIG. 4.

The heating module 14 may include N heaters connected in series, which may be identified as P_1, . . . , P_N-1, and P_N, respectively. The N heaters may heat the N battery modules, respectively.

One terminal of the first switch 13 may be connected to one terminal of the first heater P_1, and another terminal of the first switch 13 may be grounded.

One terminal of the second switch 16 may be connected to one terminal of the N-th heater P_N, and another terminal of the second switch 16 may be connected to the high-voltage end of the battery module set 20.

The voltage sampling module 17 may collect the second collected voltage data V_P_2 at point A through a first solid line 171. The voltage sampling module 17 may collect the first collected voltage data V_P_1 at point C through a second solid line 172.

In some embodiments, the signal check-back module 18 may include a first resistor R1 and a second resistor R2. One end of the first resistor R1 is connected to the control module 12, and the other end of the first resistor R1 is connected to the first switch 13. One end of the second resistor R2 is connected to the other end of the first resistor R1, and the other end of the second resistor R2 is grounded.

Specifically, when the first switch 13 operates normally, a voltage dividing circuit consisted of R1 and R2 may provide a gate driving voltage for the first switch 13. When the first switch 13 is over-temperature or there is an over-temperature due to a short-circuit current with the drain directly connected to the power supply, the first switch 13 may internally short circuit the gate-to-source impedance Rgs of the first switch 13, so that the equivalent parallel resistance value from parallelization of Rgs and R2 becomes much smaller than R2. As a result, the gate driving voltage at the gate of the first switch 13 obtained by voltage dividing is far smaller than a threshold voltage that may enable the first switch 13 to be turned on. In this way, the first switch 13 is turned off, and an over-temperature protection is achieved at the first switch 13.

In an optional embodiment, in order to enable the first switch 13 to have a good over-temperature protection performance, the first resistor R1, the second resistor R2, and a short-circuit input impedance RS of the first switch 13 may simultaneously satisfy formula (3) and formula (4):

$$R2 > 10 \times R1 \quad (3)$$

$$R1 \gg 10 \times RS \quad (4)$$

RS may represent the gate input impedance when the gate is shorted to the source.

It should be noted that R1 and R2 need to be within a reasonable range, so that the magnitude of the driving current of the first switch 13 may meet a corresponding requirement.

In some embodiments, the control module 12 may include a controller 121 and a driving unit 122. In these embodiments, the battery heating circuit 40 may further include an isolation unit 110.

In order to electrically isolate the communication between the controller 121 and other function modules or function units, the isolation unit 110 may be provided on a line between the controller 121 and the driving unit 122, a line between the controller 121 and the voltage sampling module 17, and a line between the controller 121 and the signal check-back module 18.

In some embodiments, both the first calibration voltage and the second calibration voltage may be collected by the voltage sampling module 17. In these embodiments, a dashed line 173 in FIG. 4 may indicate that the voltage sampling module 17 collects a voltage at point C, and the collected voltage may be used as the first calibration voltage $Va_0$. A solid line 172 may indicate that the voltage sampling module 17 collects a voltage at point B, and the collected voltage may be used as the second calibration voltage $Vb_0$.

It should be noted that the first calibration voltage $Va_0$ may also be directly obtained according to a parameter(s) of the battery module and a parameter(s) of the battery module set.

It should also be noted that, in order to quickly disconnect the connection between the battery module set 20 and the battery heating circuit 40, a switch may be provided at either end of the battery module set 20, or at both ends of the battery module set 20. For example, as shown in FIG. 4, a switch K1 and a switch K2 are respectively provided at both ends of the battery module set 20.

It is noted that the control module 12 may control K1 and/or K2 to be turned off when the first switch 13 and the second switch 16 fail to be off due to a failure, so as to ensure the safe heating of the battery heating system.

Figure 5:
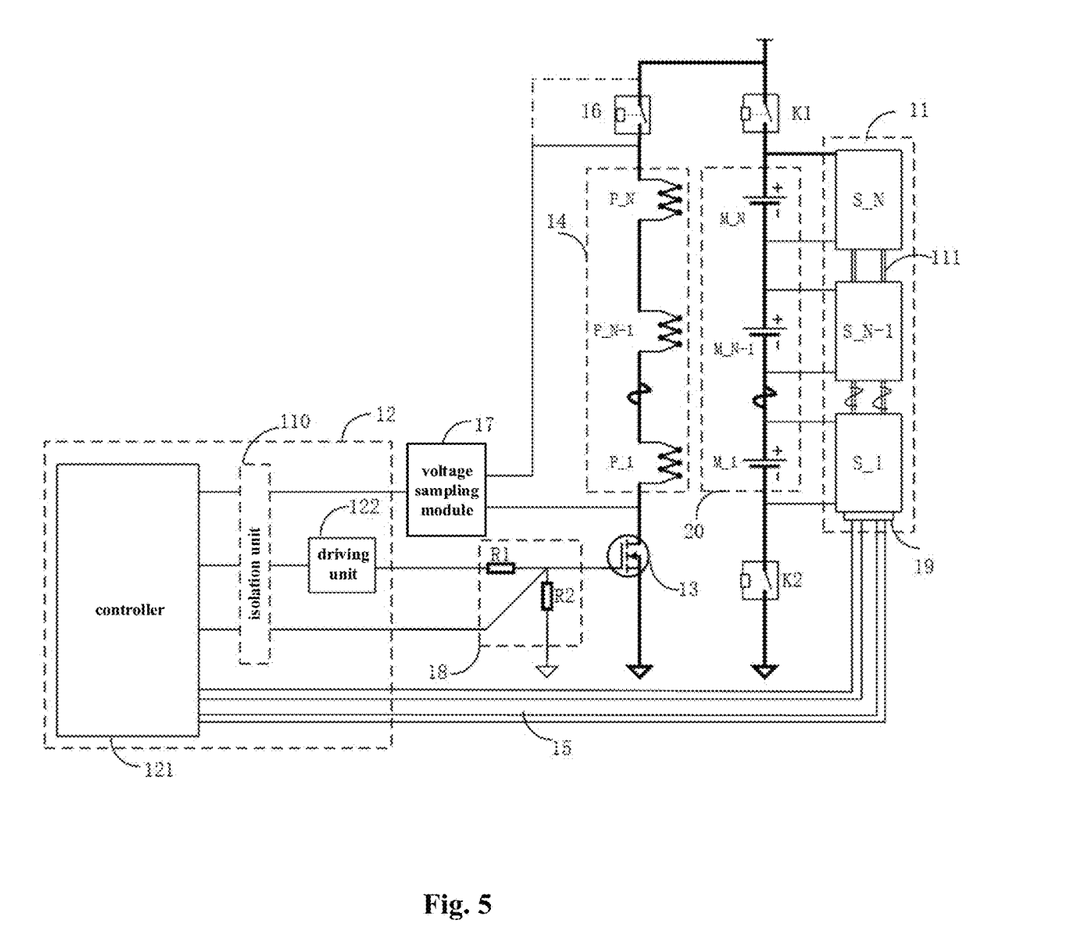
FIG. 5 is a schematic structural diagram of another battery heating circuit according to an embodiment of the present disclosure.

In other embodiments of the present disclosure, when the target sampling temperature is the real-time temperature of the external environment of the battery pack to which the battery module set 20 belongs, an implementation of the battery heating system 10 may use another battery heating circuit. FIG. 5 is a schematic structural diagram of another battery heating circuit according to an embodiment of the present disclosure.

FIG. 5 differs from FIG. 4 in that the temperature sampling module 11 may include N temperature sampling units, which are identified as S_1, . . . , S_N-1, and S_N, respectively. Adjacent temperature sampling units may be connected via a second communication line 111.

The N temperature sampling units are respectively disposed at both ends of the N battery modules. For example, the temperature sampling unit S_1 is disposed at both ends of the battery module M_1, . . . , the temperature sampling unit S_N-1 is disposed at both ends of the battery module M_N-1, and the temperature sampling unit S_N is disposed at both ends of the battery module M_N.

After each temperature sampling unit collects the real-time temperature of the corresponding battery module, the real-time temperatures of multiple battery modules may be transferred among the temperature sampling units through the second communication line 111. After the real-time temperatures of the N battery modules are gathered, they are converted into a data stream in conformity with the first communication line protocol through the isolation communication unit 19, and then transmitted to the controller through the first communication line 15.

It should be noted that this embodiment illustrates only one transmission fashion of the real-time temperature(s) of the battery module(s), data about the real-time temperature (s) of the battery module(s) may be sent to the controller 121 respectively or gathered and then sent to the controller 121, by wireless or wired means.

Figure 6:
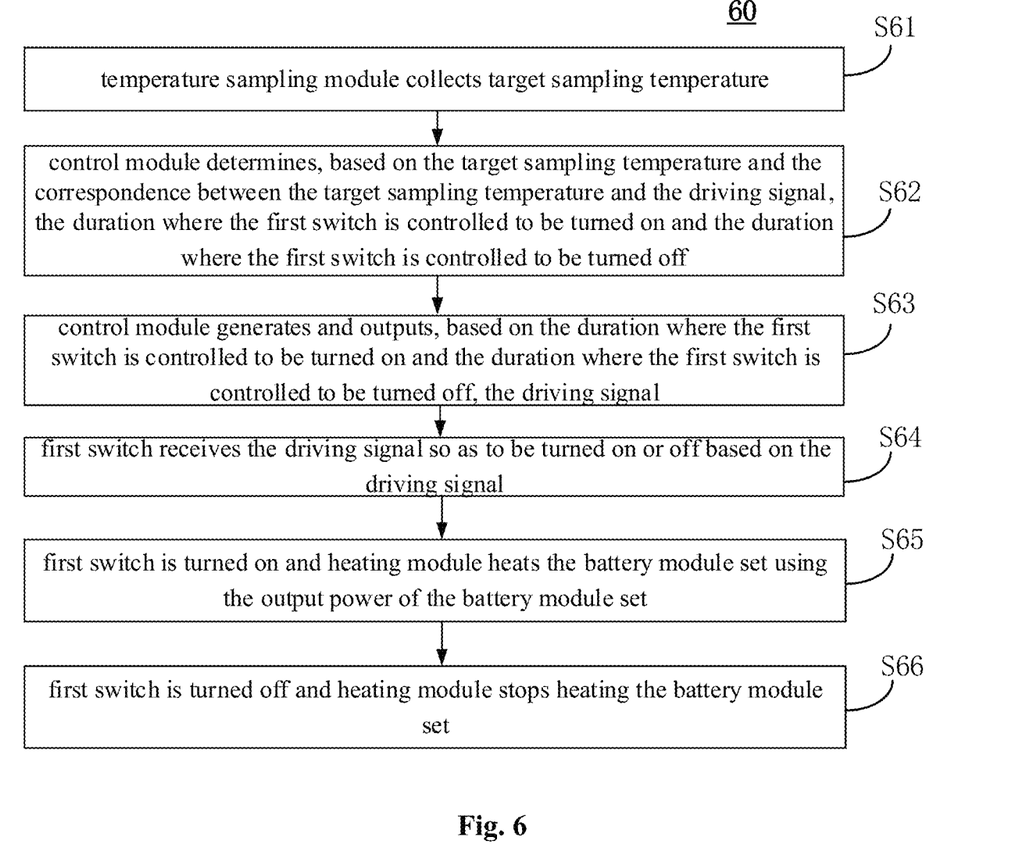
FIG. 6 illustrates a flowchart of a battery heating method according to an embodiment of the present disclosure.

Based on the same concept, battery heating methods are also provided in the embodiments of the present disclosure. FIG. 6 illustrates a flowchart of a battery heating method according to an embodiment of the present disclosure, which may be applicable to the above battery heating system(s). As shown in FIG. 6, a battery heating method 60 may include S61 to S66.

At S61, the temperature sampling module 11 may collect the target sampling temperature.

At S62, the control module 12 may determine, based on the target sampling temperature and the correspondence between the target sampling temperature and the driving signal, the duration where the first switch 13 is controlled to be turned on and the duration where the first switch 13 is controlled to be turned off.

At S63, the control module 12 may generate and output, based on the duration where the first switch 13 is controlled to be turned on and the duration where the first switch 13 is controlled to be turned off, the driving signal.

At S64, the first switch 13 may receive the driving signal so as to be turned on or off based on the driving signal.

At S65, the first switch 13 may be turned on, and the heating module 14 may heat the battery module set 20 using the output power of the battery module set 20.

At S66, the first switch 13 may be turned off, and the heating module 14 may stop heating the battery module set 20.

In some embodiments of the present disclosure, the heating module 14 may include N heaters, and the N heaters may be in one-to-one correspondence with the N battery modules included in the battery module set 20, where N is a positive integer.

In some embodiments of the present disclosure, when the second switch is disposed between the another terminal of the heating module 14 and the another terminal of the battery module set 20, the battery heating method 60 may further include following operations.

The control module 12 may collect the first collected voltage data and the second collected voltage data. The first collected voltage data may represent voltage data at the one terminal of the heating module 14, and the second collected voltage data may represent voltage data at the another terminal of the heating module 14. The one terminal of the heating module 14 may be connected to the negative electrode of the battery module set 20, and the another terminal of the heating module 14 may be connected to the positive electrode of the battery module set 20.

The control module 12 may determine whether the battery heating system 10 is operating normally based on the first collected voltage data, the second collected voltage data, and the preset normal operation judgment condition.

If both the first collected voltage data and the second collected voltage data meet the normal operation judgment condition, the control module 12 may determine that the battery heating system 10 is operating normally.

In some embodiments, if both the first collected voltage data and the second collected voltage data meet the normal operation judgment condition, the control module 12 may determine that the battery heating system 10 is normally operating, which may include following Step 1 to Step 4.

At Step 1, before the heating module 14 heats the battery module set 20 using the output power of the battery module set 20, when the first switch 13 and the second switch are both turned off, both the first collected voltage data and the second collected voltage data are smaller than the preset first calibration value.

At Step 2, when the first switch 13 is turned off and the second switch is turned on, both the first collected voltage data and the second collected voltage data are greater than the preset second calibration value.

At Step 3, when both the first switch 13 and the second switch are turned on, the first collected voltage data is smaller than the preset first calibration value, and the second collected voltage data is greater than the preset second calibration value.

At Step 4, the control module 12 determines that the battery heating system 10 is operating normally.

In some embodiments, if the first collected voltage data and second collected voltage data both meet the normal operation judgment condition, the control module 12 may determine that the battery heating system 10 is operating normally, which may include following Step 1 to Step 3.

At Step 1, before the heating module 14 finishes heating the battery module set 20, when the first switch 13 is turned off and the second switch is turned on, the first collected voltage data and the second collected voltage data are both greater than the preset second calibration value.

At Step 2, when the first switch 13 and the second switch are both turned off, the first collected voltage data and the second collected voltage data are both smaller than the preset first calibration value.

At Step 3, the control module 12 determines that the battery heating system 10 is operating normally.

In some embodiments of the present disclosure, the first switch 13 may include a MOS field-effect transistor.

In some embodiments of the present disclosure, the driving signal may be a pulse signal, and the duty ratio of the pulse signal may be a ratio of the duration where the first switch 13 is controlled to be turned on to the duration where the first switch 13 is controlled to be turned off.

It should be understood that each embodiment in this specification is described in a progressive manner, and the same or similar parts among the various embodiments may make reference to each other. Each embodiment focuses on the differences from other embodiments. The method embodiments are described relatively simply. For the related parts, please refer to the description of the system embodiments. The disclosure is not limited to the specific steps and structures described above and illustrated in the drawings. Those skilled in the art may make various changes, modifications, and additions, or change the order of the steps after comprehending the spirit of the present disclosure. And, for the sake of brevity, detailed descriptions of known method technologies are omitted here.

The function modules in the above embodiments (such as the temperature sampling module, the temperature sampling unit, the control module, the controller, the driving unit, the first switch, the second switch, the heating module, the isolation unit, the isolation conversion unit, and the signal check-back module and the isolated conversion unit) may be implemented as hardware, software, firmware, or a combination thereof. When implemented in hardware, it may be, for example, an electronic circuit, an application specific integrated circuit (ASIC), appropriate firmware, a plug-in device, a function card, and the like. When implemented in software, the elements of the present disclosure may be program(s) or code segment(s) that is used to perform the required tasks. The program(s) or code segment(s) may be stored in a machine-readable medium, or transmitted on a transmission medium or a communication link through a data signal carried on a carrier wave. A "machine-readable medium" may include any medium capable of storing or transmitting information.

What is claimed is:

1. A battery heating system, comprising:
a temperature sampling module configured to collect a target sampling temperature, wherein the target sampling temperature comprises a real-time temperature of a battery module set or a real-time temperature of an external environment of a battery pack to which the battery module set belongs, the battery module set comprises N battery modules, and N is a positive integer;
a first switch configured to be turned on or off based on a driving signal;
a control module configured to determine, based on the target sampling temperature and a correspondence between target sampling temperatures and driving signals, a duration where the first switch is controlled to be turned on and a duration where the first switch is controlled to be turned off; and generate, based on the duration where the first switch is controlled to be turned on and the duration where the first switch is controlled to be turned off, the driving signal, wherein the correspondence between target sampling temperatures and driving signals comprises a correspondence between the target sampling temperature and the duration where the first switch is controlled to be turned on and a correspondence between the target sampling temperature and the duration where the first switch is controlled to be turned off;
a heating module, wherein one terminal of the heating module is connected to a negative electrode of the battery module set via the first switch, and another terminal of the heating module is connected to a positive electrode of the battery module set via a second switch, and wherein the heating module is configured to heat the battery module set using an output power of the battery module set when the first switch is turned on, and stop heating the battery module set when the first switch is turned off; and
a voltage sampling module connected to both the one terminal and the another terminal of the heating module and configured to collect first collected voltage data at the one terminal of the heating module and second collected voltage data at the another terminal of the heating module;
wherein the control module is further configured to determine that the battery heating system is operating normally if both the first collected voltage data and the second collected voltage data satisfy a normal operation judgment condition;
wherein the normal operation judgment condition comprises:
before the battery module set is heated by the heating module: when both the first switch and the second switch are turned off, both the first collected voltage data and the second collected voltage data are smaller than a preset first calibration value; when the first switch is turned off and the second switch is turned on, both the first collected voltage data and the second collected voltage data are greater than a preset second calibration value; and when both the first switch and the second switch are turned on, the first collected voltage data is smaller than the preset first calibration value and the second collected voltage data is greater than the preset second calibration value,
or
before the heating module finishes heating of the battery module set: when the first switch is turned off and the second switch is turned on, both the first collected voltage data and the second collected voltage data are greater than the preset second calibration value; and when both the first switch and the second switch are turned off, both the first collected voltage data and the second collected voltage data are smaller than the preset first calibration value;
wherein the first calibration value is a product of a first calibration voltage and a first calibration coefficient, and the first calibration voltage is a voltage at a connection of the second switch and the positive electrode of the battery module set when both the first switch and the second switch are turned off and the battery module set outputs a rated voltage, and
the second calibration value is a product of a second calibration voltage and a second calibration coefficient, and the second calibration voltage is a voltage at a connection of the heating module and the first switch when both the first switch and the second switch are turned on and the battery module set outputs the rated voltage.

2. The battery heating system according to claim 1, wherein the heating module comprises N heaters connected in series, and the N heaters are in one-to-one correspondence with the N battery modules in the battery module set.

3. The battery heating system according to claim 1, wherein the first switch comprises a metal oxide semiconductor field-effect transistor.

4. The battery heating system according to claim 1, wherein the driving signal is a pulse signal, and a duty ratio of the pulse signal is a ratio of the duration where the first switch is controlled to be turned on to the duration where the first switch is controlled to be turned off in each pulse cycle.

5. A battery heating method applied to the battery heating system according to claim 1, wherein the battery heating method comprises:
collecting, by the temperature sampling module, a target sampling temperature, wherein the target sampling temperature comprises a real-time temperature of the battery module set or a real-time temperature of an external environment of a battery pack to which the battery module set belongs, the battery module set comprises N battery modules, and N is a positive integer;

determining, by the control module, based on the target sampling temperature and a correspondence between target sampling temperatures and driving signals, a duration where the first switch is controlled to be turned on and a duration where the first switch is controlled to be turned off, wherein the correspondence between the target sampling temperatures and the driving signals comprises a correspondence between the target sampling temperature and the duration where the first switch is controlled to be turned on and a correspondence between the target sampling temperature and the duration where the first switch is controlled to be turned off;

generating and outputting, by the control module based on the duration where the first switch is controlled to be turned on and the duration where the first switch is controlled to be turned off, a driving signal;

receiving, by the first switch, the driving signal so as to be turned on or off based on the driving signal;

heating, by the heating module, the battery module set using an output power of the battery module set when the first switch is turned on, wherein one terminal of the heating module is connected to a negative electrode of the battery module set via the first switch, and the another terminal of the heating module is connected to a positive electrode of the battery module set via a second switch; and stopping, by the heating module, heating of the battery module set when the first switch is turned off, collecting, by the voltage sampling module, first collected voltage data and second collected voltage data, wherein the first collected voltage data indicates voltage data at one terminal of the heating module, and the second collected voltage data indicates voltage data at another terminal of the heating module, wherein the voltage sampling module is connected to both the one terminal and the another terminal of the heating module; and determining, by the control module, that the battery heating system is operating normally if both the first collected voltage data and the second collected voltage data satisfy a normal operation judgment condition;

wherein the normal operation judgment condition comprises one of the followings:

before the battery module set is heated by the heating module: when both the first switch and the second switch are turned off, both the first collected voltage data and the second collected voltage data are smaller than a preset first calibration value; when the first switch is turned off and the second switch is turned on, both the first collected voltage data and the second collected voltage data are greater than a preset second calibration value; and when both the first switch and the second switch are turned on, the first collected voltage data is smaller than the preset first calibration value and the second collected voltage data is greater than the preset second calibration value, or before the heating module finishes heating of the battery module set: when the first switch is turned off and the second switch is turned on, both the first collected voltage data and the second collected voltage data are greater than the preset second calibration value; and when both the first switch and the second switch are turned off, both the first collected voltage data and the second collected voltage data are smaller than the preset first calibration value;

wherein the first calibration value is a product of a first calibration voltage and a first calibration coefficient, and the first calibration voltage is a voltage at a connection of the second switch and the positive electrode of the battery module set when both the first switch and the second switch are turned off and the battery module set outputs a rated voltage, and the second calibration value is a product of a second calibration voltage and a second calibration coefficient, and the second calibration voltage is a voltage at a connection of the heating module and the first switch when both the first switch and the second switch are turned on and the battery module set outputs the rated voltage.

6. The battery heating method according to claim 5, wherein:

the heating module comprises N heaters connected in series, the N heaters are in one-to-one correspondence with the N battery modules in the battery module set, and N is a positive integer.

7. The battery heating method according to claim 5, wherein the first switch comprises a metal oxide semiconductor field-effect transistor.

8. The battery heating method according to claim 5, wherein:

the driving signal is a pulse signal, and a duty ratio of the pulse signal is a ratio of the duration where the first switch is controlled to be turned on to the duration where the first switch is controlled to be turned off.

* * * * *